No. 670,072. Patented Mar. 19, 1901.
J. M. FLEMING.
COLLAR FOR SHAFTING.
(Application filed Nov. 2, 1900.)
(No Model.)
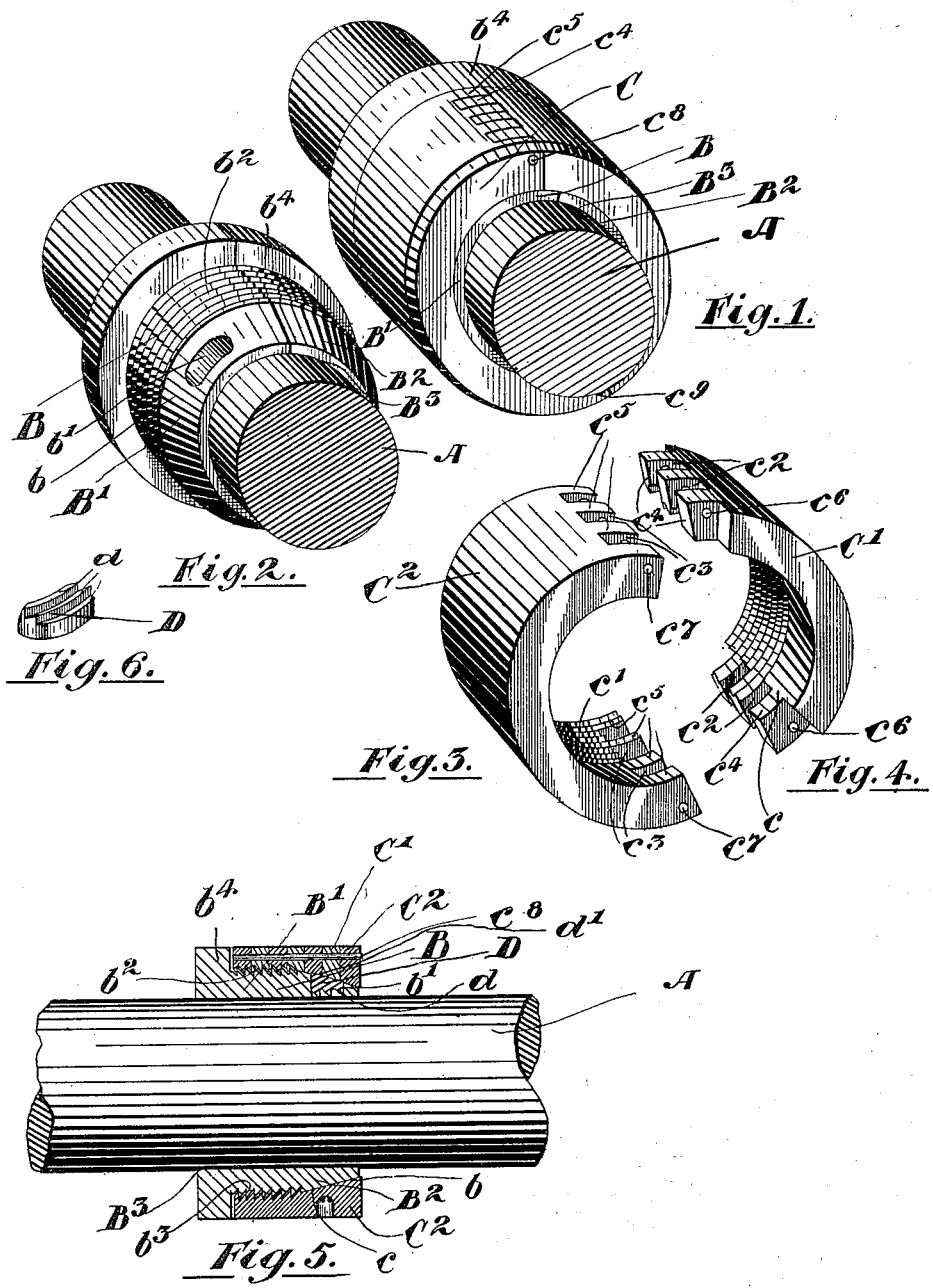
Witnesses.
E. P. Fetherstonhaugh.
F. C. Askwith.
Inventor:
J. M. Fleming
by Fetherstonhaugh & Co
Attys

UNITED STATES PATENT OFFICE.

JOHN MILLER FLEMING, OF OTTAWA, CANADA, ASSIGNOR OF ONE-HALF TO WILLIAM NUTTALL, OF SAME PLACE.

COLLAR FOR SHAFTING.

SPECIFICATION forming part of Letters Patent No. 670,072, dated March 19, 1901.

Application filed November 2, 1900. Serial No. 35,279. (No model.)

*To all whom it may concern:*

Be it known that I, JOHN MILLER FLEMING, of the city of Ottawa, in the county of Carleton, in the Province of Ontario, Canada, have invented certain new and useful Improvements in Collars for Shafting, of which the following is a specification.

My invention relates to improvements in collars for shafting; and the object of my invention is to design a simple and cheaply-constructed collar which is readily adjustable for small differences in the size of the shaft, is perfectly concentric with the shaft, and which may be easily removed from the shaft without removing such shaft from its bearings; and it consists, essentially, of a collar divided longitudinally into two parts and having a central hole to fit the shaft and externally threaded and tapered portions designed to fit corresponding internally threaded and tapered portions in a sleeve which is preferably divided longitudinally into two parts, said two parts being connected together by a suitable joint, and a toothed gripping-piece being also provided and inserted in a slot or aperture in the tapered portion of the hub and being in such a position and of such shape as to be forced to grip the shaft when the said sleeve is screwed onto the hub, the various parts being constructed and arranged in detail as hereinafter more particularly described.

Figure 1 is a perspective view of my collar on the shaft. Fig. 2 is a perspective view of my collar proper. Figs. 3 and 4 are views of the two portions of the sleeve. Fig. 5 is a longitudinal section through the collar. Fig. 6 is a detail of the toothed gripping-piece.

In the drawings like letters of reference indicate corresponding parts in each figure.

A is the shaft, to which the collar is attached.

B is the hub of the collar, divided into two parts $B'$ $B^2$ longitudinally and having the central hole $B^3$ for the shaft. The hub B has a tapered end $b$, in which is a slot or aperture $b'$, extending through the hub to the hole $B^3$. Adjacent to the tapered end the hub B has a threaded portion $b^2$, the thread being preferably formed with its bearing-face $b^3$ normal to the axis of the shaft A. A flange or shoulder $b^4$ is formed at the end of the hub B.

C is the sleeve, which may be made in one piece, but is preferably longitudinally divided into the unequal segments $C'$ $C^2$. The sleeve C has an internally-tapered portion $c$ and an internally-threaded portion $c'$, corresponding to the tapered and threaded portions on the hub B. The segments $C'$ $C^2$ of the sleeve are joined at their edges preferably by a locked mortise-and-tenon joint. Alternate mortises $c^2$ $c^3$ and tenons $c^4$ $c^5$ are formed at the edges of the segments $C'$ $C^2$. Holes $c^6$ $c^7$ are bored through the tenons $c^4$ $c^5$, so as to be in alinement when the segments are fitted together. Keys or locking-rods $c^8$ $c^9$ are made to fit in the holes and hold the segments from coming apart when fitted together. D is a gripping-piece designed to fit in the slot or aperture $b'$.

Teeth $d$ are formed on the inner face of the gripping-piece D to grip the shaft and prevent any movement of the collar on same. The outer surface $d'$ of the gripping-piece is of a similar curve and taper to the tapered part of the hub, but projects slightly above the surface of the hub.

It will now be seen that to attach my collar to a shaft all that is necessary to do is first place the two halves of the hub around the shaft and insert the gripping-piece in the slot. Then put the two pieces of the sleeve around the shaft and lock them together by the mortise-and-tenon joint and the keys or locking-pins. Then screw the sleeve hard onto the hub and the two portions of the hub will pinch the shaft and the gripping-piece will grip the same, thus perfectly securing the collar in position on the shaft. To remove the collar, the keys or locking-pins are knocked out of the holes and the collar may be then taken off.

The reason for making one segment of the sleeve larger than the other is to prevent too great a strain coming on the keys when the sleeve is tightened up. The larger segment of the sleeve is preferably made of such a size as to just allow of its being removed from the shaft.

In the old style of collar, which is attached to a shaft by a set-screw, there has always been a great deal of trouble from the set-screw slipping and from the eccentricity of the collar when put on a shaft which is of smaller diameter than the hole of the collar. This eccentricity, combined with the weight of the set-screw, often produces a vibration in high-speed machinery which is ruinous to the machinery. Another danger in the old form of collar is that workmen frequently have their clothes caught by the projecting set-screws on the collars, and many accidents have occurred from this cause. My collar gets rid of these difficulties entirely in the following manner: The teeth of the gripping-piece being firmly forced into the shaft, there is no possibility of the shaft slipping. Being perfectly concentric with the shaft and having no extra weight on any side, it causes no vibrations, and as there is no projecting set-screw there is no danger of accident from this cause.

One of the greatest advantages of my collar is that it may be removed from the shafting without removing such shaft from its bearings.

What I claim as my invention is—

1. In a collar for shafting the combination with a hub longitudinally divided into two parts, and having a smooth tapered portion and a threaded portion, and a central hole to receive the shaft; of a sleeve made in one piece, and having an internally-tapered smooth portion, and an internally-threaded portion, as and for the purpose specified.

2. In a collar for shafting the combination with a hub longitudinally divided into two parts and having a tapered and a threaded portion, and a central hole to receive the shaft, and having an aperture or slot in said tapered portion and a toothed gripping-piece in said slot or aperture of a sleeve having a corresponding internally-tapered portion and an internally-threaded portion as and for the purpose specified.

3. In a collar for shafting the combination with a hub longitudinally divided into two parts and having a tapered and a threaded portion and a central hole to receive the shaft, and having an aperture or slot in said tapered portion and a toothed gripping-piece in said slot or aperture having a curved and sloping outer surface, of a sleeve having an internally-tapered portion and an internally-threaded portion as and for the purpose specified.

4. In a collar for shafting in combination a hub longitudinally divided into two parts and having a tapered and a threaded portion and a central hole to receive the shaft and having an aperture or slot in said tapered portion, a toothed gripping-piece in said aperture or slot, and a sleeve comprising two parts or segments suitably joined together and having an internally-tapered portion and an internally-threaded portion as and for the purpose specified.

5. In a collar for shafting in combination a hub longitudinally divided into two parts and having a tapered and a threaded portion and a central hole to receive the shaft, and having an aperture or slot in said tapered portion a toothed gripping-piece in said aperture or slot a sleeve composed of two parts or segments joined together by a mortise-and-tenon joint, and means for locking said joint as and for the purpose specified.

6. In a collar for shafting the combination a hub longitudinally divided into two parts and having a tapered and a threaded portion, and a central hole to receive the shaft, and having an aperture or slot in said tapered portion, and a toothed gripping-piece in said slot, a sleeve composed of two parts or segments joined together by a mortise-and-tenon joint there being holes passing through all the tenons of each joint and keys or locking-bars to fit in said holes as and for the purpose specified.

7. In a collar for shafting in combination, a hub longitudinally divided into two parts having a tapered and a threaded portion and a central hole to receive the shaft and having an aperture or slot in said tapered portion; a toothed gripping-piece in said aperture or slot; and a sleeve composed of two unequal parts or segments joined together by a mortise-and-tenon joint, and keys or locking-pins to fit in the said holes as and for the purpose specified.

Signed at Ottawa, Canada, this 26th day of October, 1900.

JOHN MILLER FLEMING.

Witnesses:
E. P. FETHERSTONHAUGH,
F. C. ASKWITH.